United States Patent
Louis et al.

(12)

(10) Patent No.: US 6,554,537 B1
(45) Date of Patent: Apr. 29, 2003

(54) PIPELINE CROSSING MODULE

(75) Inventors: Bill George Louis, Houston, TX (US); John G. Bomba, Houston, TX (US)

(73) Assignee: Coflexip (FR)

( * ) Notice: Subject to any disclaimer, the term of this patent is extended or adjusted under 35 U.S.C. 154(b) by 0 days.

(21) Appl. No.: 09/709,178

(22) Filed: Nov. 10, 2000

(51) Int. Cl.$^7$ .............................. F16L 1/20; F16L 3/08; F16L 3/12

(52) U.S. Cl. ................ 405/154.1; 405/157; 405/158; 248/68.1; 248/69; 248/74.1

(58) Field of Search ................. 405/154.1, 157, 405/158; 248/62, 68.1, 69, 74.1, 74.2, 74.3, 74.4, 65

(56) References Cited

U.S. PATENT DOCUMENTS

| | | | | |
|---|---|---|---|---|
| 675,104 A | * | 5/1901 | Oberle | 405/157 |
| 2,684,222 A | * | 7/1954 | Miller | 405/157 |
| 3,747,166 A | | 7/1973 | Eross | |
| 4,244,542 A | * | 1/1981 | Mathew | 248/49 |
| 4,295,618 A | * | 10/1981 | Morota et al. | 248/74.1 |
| 4,406,434 A | * | 9/1983 | Schneckloth | 248/83 |
| 4,407,472 A | * | 10/1983 | Beck | 248/89 |
| 4,445,656 A | * | 5/1984 | Leitch et al. | 248/74.1 |
| 4,516,296 A | * | 5/1985 | Sherman | 248/74.1 |
| 5,156,491 A | * | 10/1992 | Russellf | 405/157 |
| 5,697,585 A | * | 12/1997 | Hungerford, Jr. | 248/74.3 |
| 5,871,306 A | * | 2/1999 | Tilcox | 405/157 |
| 5,906,341 A | * | 5/1999 | Brown | 248/68.1 |
| 6,105,216 A | * | 8/2000 | Opperthauser | 248/74.1 |
| 6,147,050 A | * | 11/2000 | Marshall | 248/74.1 |
| 6,206,613 B1 | * | 3/2001 | Elkins | 405/157 |
| 6,250,591 B1 | * | 6/2001 | Cunningham | 248/74.1 |

FOREIGN PATENT DOCUMENTS

DE     29905055 U1     7/1999     ............. F16B/7/08

OTHER PUBLICATIONS

PCT Notification of Transmittal of the International Search Report or the Declaration dated Mar. 8, 2002.
PCT International Search Report.

* cited by examiner

Primary Examiner—Thomas B. Will
Assistant Examiner—Alexandra K. Pechhold
(74) Attorney, Agent, or Firm—Ostrolenk, Faber, Gerb & Soffen, LLP

(57) ABSTRACT

In combination, a lower pipeline, an upper pipeline which crosses the lower pipeline, and at least one pipeline crossing module for supporting the upper pipeline above the lower pipeline. The pipeline crossing module may comprise a spacing element; a clip element attached to the spacing element and sized for surrounding the upper pipeline while permitting the module to rotate about the upper pipeline to a position in which the module is disposed downward from the upper pipeline. The at least one module may comprise a first module and a second module, the first module and the second module being disposed on the upper pipeline so as to define a downward-facing support surface for contacting an upper surface of the lower pipeline to support the upper pipeline thereon. Or, the first module and the second module may be sized for being disposed resting on the seabed, at respective locations along the length of the upper pipeline on opposite sides of the lower pipeline, so as to support the upper pipeline bridging over the lower pipeline.

13 Claims, 5 Drawing Sheets

PIPELINE CROSSING MODULE

BACKGROUND OF THE INVENTION

The invention relates to a module for spacing at least two pipelines at a crossing point on a seabed.

When two pipelines cross on the seabed, it is preferable for the two pipes not to touch each other, for two reasons. The first is to avoid damage to the pipe coatings, which could lead to pipe corrosion. The second reason is to avoid a single point of contact between the pipes, which could lead to a concentrated load applied to the lower pipe.

One existing method for protecting a pipeline crossing consists in arranging concrete mudmats or sand bags above the first pipeline in the vicinity of the crossing point in order to create a kind of pipe crossing mattress, so that the second pipeline can be laid on top of the support and thus avoid touching the first pipeline directly.

FIG. 1 shows a conventional pipeline crossing support 10. The pipeline crossing support 10 looks like a mattress, and covers the first pipeline 12. In this embodiment it comprises concrete mudmats. The outer surface 14 of the pipeline crossing support 10 has a smooth curve to prevent excessive bending of the second pipeline 16, and to avoid the freespan effect. The freespan effect may arise when there is a space between the pipeline and the seabed 18; currents surge into this space and induce vibrations in the pipeline, which leads to fatigue problems. That is why the crossing support 10 completely fills the gap between the pipeline 16 and the seabed, up to the touchdown points which are at the opposite ends of the crossing support 10.

Generally, the length L of the crossing support 10 is on the order of several meters (between 5 and 15 m) from the first pipeline 12 to each end of the crossing support 10. This length can vary, depending on the thickness of the mattress and the rigidity of the pipeline.

The main problem of this method is that it leads to an increase of the laying cost due to the need for underwater work, which requires the mobilization of a vessel to perform various subsea tasks. As the water depth increases, the laying cost will dramatically increase with this method.

SUMMARY OF THE INVENTION

According to the invention, a pipeline crossing module is provided which can avoid these drawbacks.

According to an aspect of the invention, the pipeline crossing module may comprise:

- a spacing element which may be a plastic or rubber galvanic insulation separating element or simply a tripod;
- an element for loosely clamping the spacing element onto the second pipeline so that the spacing element can rotate and still remain arranged under the second pipeline due to its own weight, whereby rotation of the second pipeline during laying will not affect the downward orientation of the spacing element.

One or more of the aforesaid modules are assembled to form a pipeline crossing support for supporting the second pipeline above the first.

The pipeline crossing support may be maintained in position along the length of the second pipeline with collars clamped onto the second pipeline at each end of the crossing support. The collars may be cathodic protection collars or any other suitable type of collar. The support may comprise a plurality of modules which define a downward-facing support surface for contacting the lower pipeline. Or, the support may comprise two modules which together with the upper pipeline form a bridge over the lower pipeline.

As an alternative to being secured in place, the pipeline crossing module or modules may be allowed to slide along the upper (second) pipeline. The position of the pipeline crossing module can be monitored and adjusted for example by a Remote Operated Vehicle (ROV). This alternative may be slightly more convenient and economical, for example in cases when it is possible to install a module near the location where the first and second pipelines will cross. The module will slide along the pipeline and then the ROV will position it at the crossing point. The module will be maintained in position by the weight of the second pipeline. Thus, it may be possible to use only a single module for separating the first and second pipelines.

In deepwater laying (more than 1000 m), we can predict with an accuracy of about 12 m the position of an underwater pipe and therefore the location where a pipeline crossing region will occur.

As the predicting accuracy is around 12 m, the length of the pipeline crossing support is advantageously greater than the predicting accuracy, generally between 20 m and 40 m (60 to 120 ft). This feature of the invention assures that at the crossing point the two pipelines will be separated by a crossing module.

The thickness of the module is determined according to the required galvanic insulation, typically around 40–50 cm (18").

Other features and advantages of the present invention will become apparent from the following description of embodiments of the invention, with reference to the accompanying drawings.

DETAILED DESCRIPTION OF EMBODIMENTS OF THE INVENTION

Figure 1:
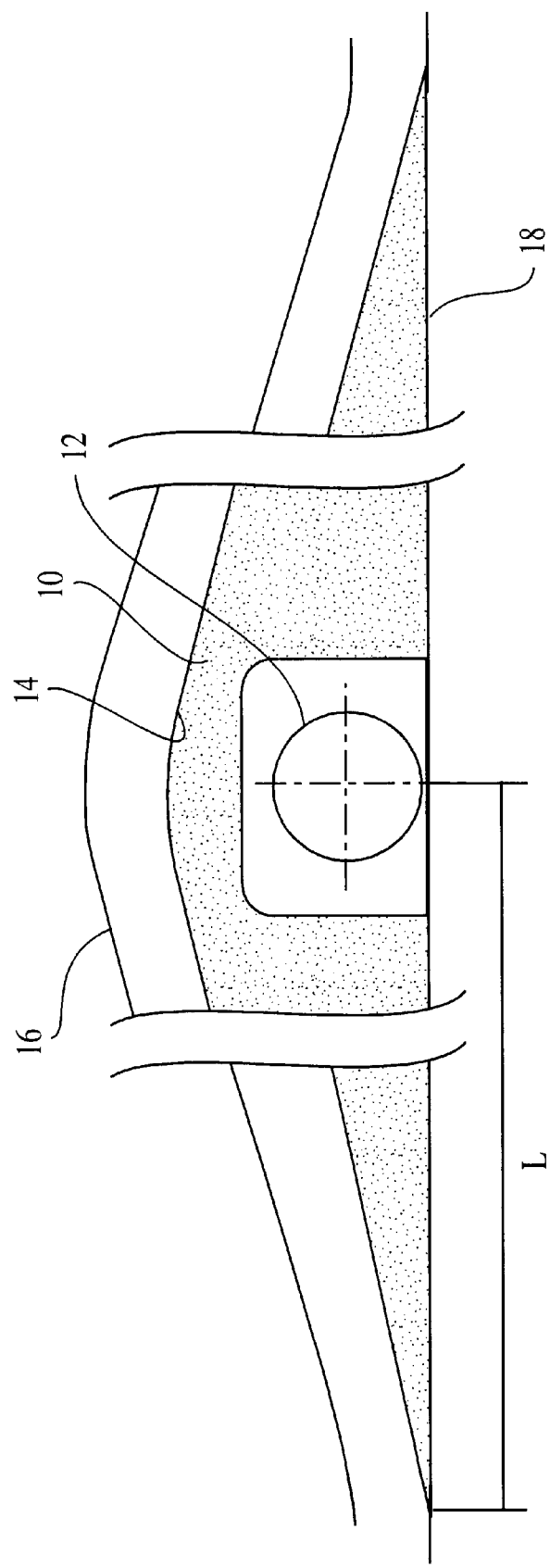
FIG. 1 is a schematic representation of a conventional pipeline crossing support.
Figure 2:
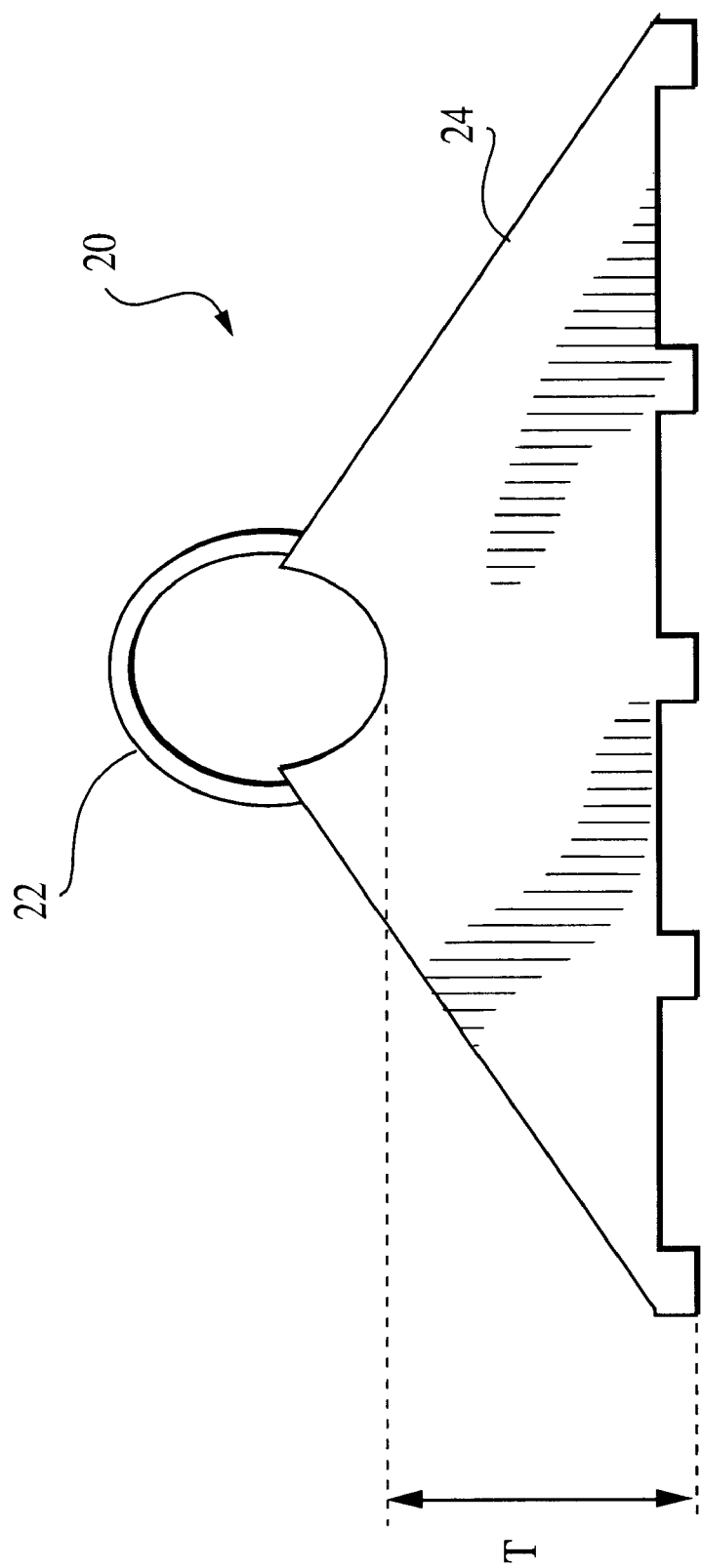
FIG. 2 is an end view.
Figure 3:
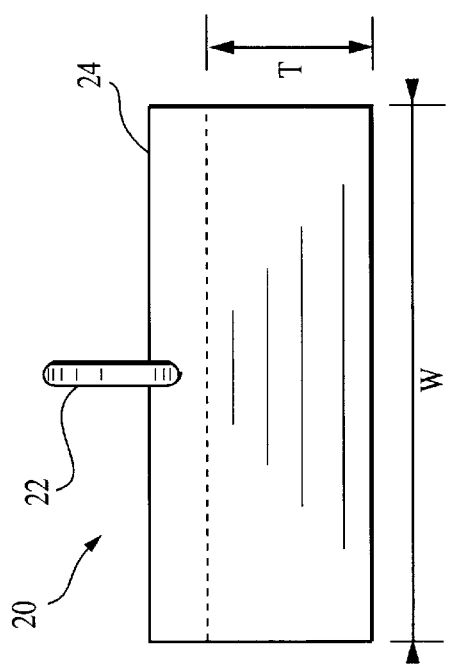
FIG. 3 is a side view of a crossing module according to a first embodiment of the invention.

FIGS. 2 and 3 are respectively an end view and a side view showing a first embodiment of the crossing module 20. A plastic or rubber spacing element 24 is provided with a U-clip 22 for connection to the upper pipeline (not shown). The element 24 advantageously has enough thickness T for providing a sufficient pipeline separation to avoid corrosion (typically 18"). The crossing module has a relatively short length W (about 1–2 m), which facilitates manufacturing, transport and installation onto the pipe.

The module is installed rotatably on the pipe in order to be sure that, whatever the rotation of the pipeline during the laying operation, the module always stays below the pipeline. In order to keep the crossing module or modules from moving lengthwise along the pipe, simple collars, for example conventional collars made of ship steel, can be fitted onto the pipe at each end of the pipeline crossing zone corresponding to the pipeline crossing support. Alternatively, modules can be held in position by conventional cathodic protection collars, or by a combination of simple collars and cathodic protection collars. As is well known, cathodic protection collars can be spaced several miles apart and still be effective. Therefore, it may be convenient to use a cathodic protection collar in combination with a nearby simple collar for holding a given module or group of modules.

Figure 4:
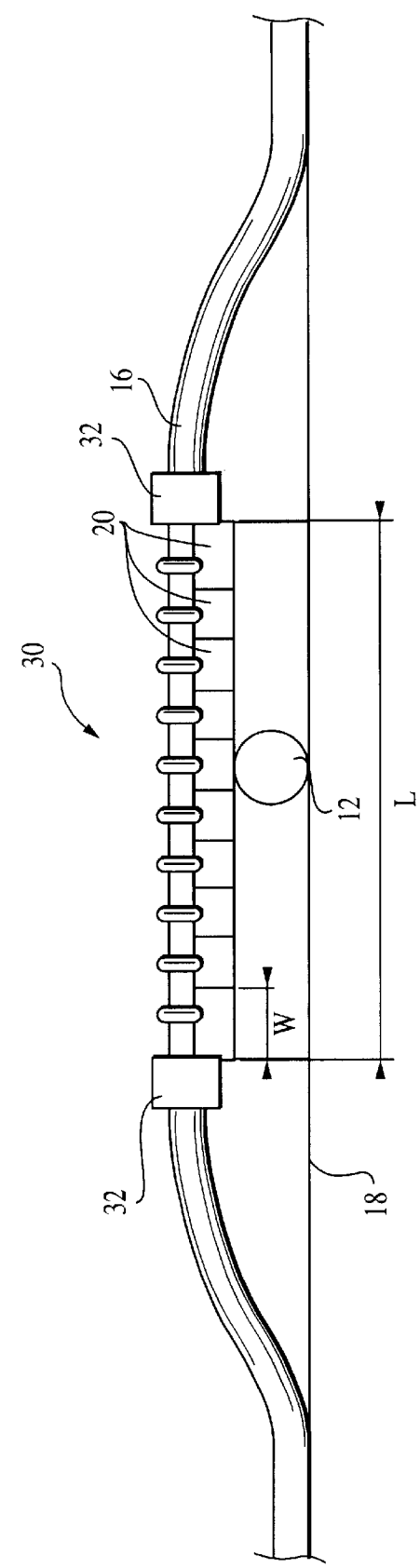
FIG. 4 shows a first embodiment of a crossing support using the above crossing module to separate two pipelines.

FIG. 4 shows a first embodiment of a pipeline crossing support 30 which uses the above crossing module. A sufficient length of pipeline crossing modules 20 are attached to the pipeline (the length L may be between 20 m and 40 m). When the upper pipeline 16 arrives at the point where it crosses the lower pipeline 12, the crossing support 30 separates the two pipelines and avoids direct contact between them. The pipeline crossing support 30 comprises several pipeline crossing modules 20 arranged side by side on the pipe and maintained in position along the upper pipeline by two collars 32 fitted onto the upper pipeline 16 at each end of the crossing support 30.

In the arrangement shown in FIG. 4, there is a gap between the pipeline 16 and the seabed 18, which could induce vibration. However, in deep water, the currents close to the seabed are generally very low. Furthermore, the pipeline crossing module is designed so that the spacing of the upper pipeline above the seabed is reduced to a minimum. Thus the pipeline is subjected to minimal currents, so little or no vibration occurs.

Figure 5:
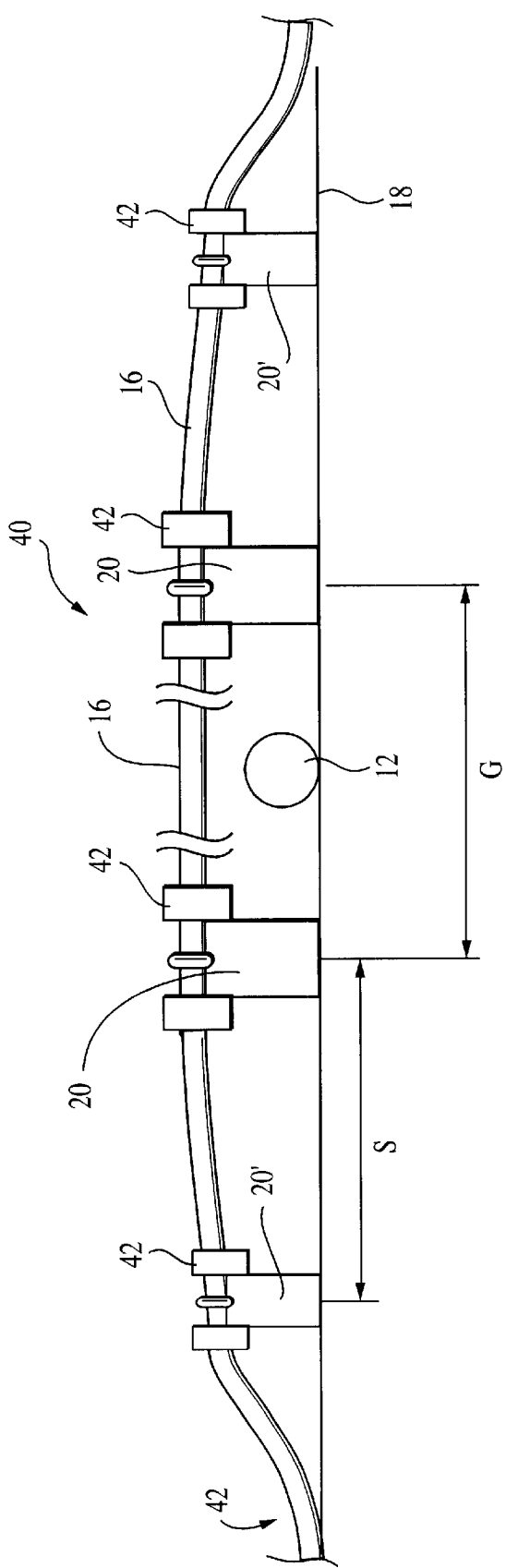
FIG. 5 shows a second embodiment of a crossing support using the crossing module to separate two pipelines.

FIG. 5 shows another embodiment of a pipeline crossing support 40 using the same type of crossing modules 20. In the embodiment of FIG. 5, the modules act like tripods to raise the upper pipeline 16 above the lower pipeline 12. In this case, the thickness T of the crossing module will be greater than in the embodiment of FIG. 4 (according to the OD of the first pipeline 12). The spacing G between the two modules 20 nearest the lower pipeline will depend on the accuracy with which the location of the lower pipeline can be predicted. The modules are held in place by collars 42. In FIG. 5, whatever the current, there will be no freespan effect as the upper pipeline is maintained in a fixed position relative to the seabed. Furthermore, as there is no contact between the two pipes, there is no risk of damaging the pipe coating.

In FIG. 5, the crossing modules 20 are used like tripods for raising the upper pipeline 16 above the lower one 12. A gap G is provided between the two crossing modules 20 which are to be disposed around the first pipeline. The length of the gap G is sufficient, according the accuracy of predicting the crossing location, to be sure that the lower pipeline will be located within the gap G, and to create a bridge above the first pipeline. The thickness T of the two crossing modules depends on the OD of the first pipeline.

The other crossing modules 20' shown in FIG. 5 are used to maintain the pipe in a fixed position relative to the seabed up to the two touchdown points 42 at either end of the crossing support 40. The number of crossing modules and the spacing S between the pairs of crossing modules 20 and 20' depend on the seabed currents, the pipeline characteristics and the height of the bridge and these factors are determined so that the seabed currents will not induce substantial vibrations.

As an alternative, the two crossing modules 20 bridging the first pipe in FIG. 5 can be replaced by several crossing modules 20 according to the embodiment shown in FIG. 4, and the other crossing modules 20' of the FIG. 5 embodiment can be employed for protecting the pipe from vibrations.

Figure 6:
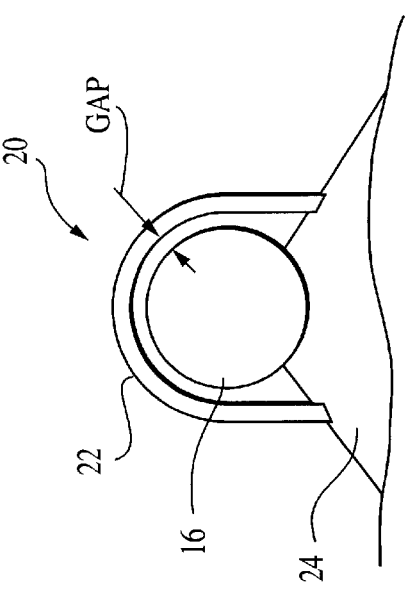
FIG. 6 is a detail view of the U-clip of the crossing module of FIGS. 2 and 3.

FIG. 6 is a detail view showing the connection between the upper pipeline 16 and the crossing module 20. It shows the gap between the pipeline and the U-clip 22 which enables the pipeline 16 to rotate inside the U-clip 22.

Figure 7:
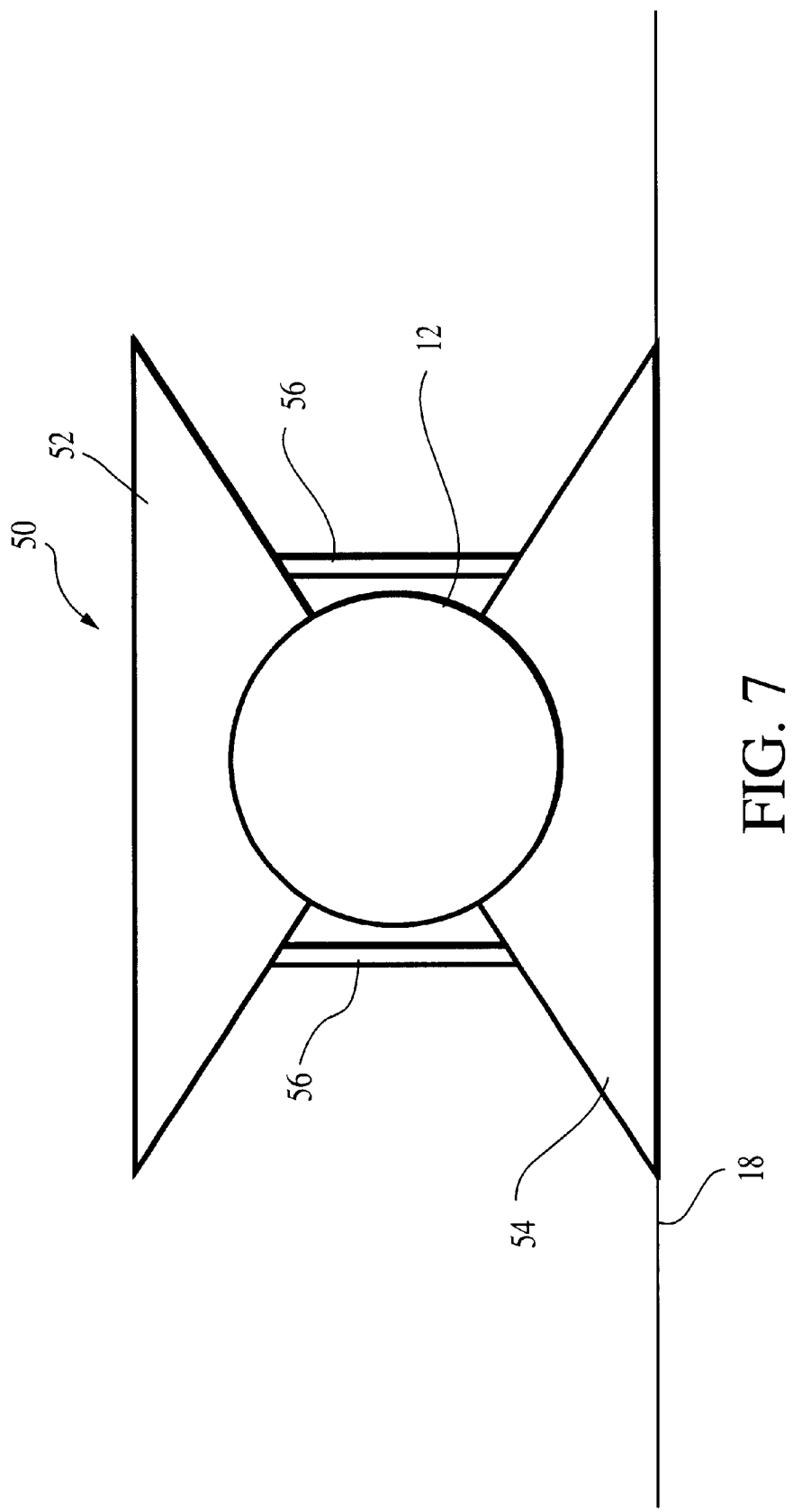
FIG. 7 is an end view of a crossing module according to another embodiment of the invention.

FIG. 7 shows another embodiment 50 of the pipeline crossing module. This pipeline crossing module 50 is arranged on the first (bottom) pipeline 12 when it is known that a future crossing will be required. This pipeline crossing module 50 is composed of two spacing elements 52 and 54, which are arranged respectively above and below the bottom pipeline 12 and are linked together by clips 56. The lower spacing element may be made heavier than the upper spacing element 52 so that the module 50 will arrive on the seabed in the position shown when the lower pipeline 12 is laid. Alternatively, the module 50 may be arranged on the lower pipeline by an ROV or by any other conventional means. The upper pipeline (not shown) can then be laid upon the top spacing element 52 when the need arises.

Although the present invention has been described in relation to particular embodiments thereof, many other variations and modifications and other uses will become apparent to those skilled in the art. Therefore, the present invention is not limited by the specific disclosure herein.

What is claimed is:

1. In combination, an undersea pipeline and a pipeline crossing module for supporting said pipeline, said pipeline crossing module comprising:
   a spacing element;
   a clip element attached to said spacing element and loosely surrounding the pipeline so as to permit the module to rotate about the pipeline due to its own weight to a position in which the spacing element is disposed downward from the pipeline.

2. The combination of claim 1, wherein said spacing element has a substantially flat downward-facing surface.

3. The combination of claim 1, wherein said spacing element and clip element are sized for supporting said undersea pipeline above the seabed with sufficient spacing for permitting a second undersea pipeline to pass under said undersea pipeline.

4. The combination of claim 3, wherein said spacing element has a substantially flat downward-facing surface for contacting the seabed.

5. In combination, a lower undersea pipeline, an upper undersea pipeline which is separate from said lower pipeline and crosses the lower pipeline, and at least one pipeline crossing module, said pipeline crossing module comprising:
   a spacing element;
   a clip element attached to said spacing element and loosely surrounding the upper pipeline so as to permit the module to rotate about the upper pipeline due to its own weight to a position in which the spacing element is disposed downward from the upper pipeline;
   wherein said module is disposed on said upper pipeline so that said spacing element supports the upper pipeline above the lower pipeline.

6. The combination of claim 5, wherein said at least one module comprises a first module and a second module, wherein said first module and said second module are disposed on said upper pipeline so that their respective spacing elements together define a downward-facing support surface which contacts an upper surface of said lower pipeline to support said upper pipeline thereon.

7. The combination of claim 5, wherein said at least one module comprises a first module and a second module, wherein said first module and said second module are disposed on said upper pipeline and their respective spacing elements are sized for being disposed resting on the seabed, at respective locations along the length of said upper pipeline on opposite sides of said lower pipeline, so as to support said upper pipeline bridging over said lower pipeline.

8. The combination of claim 5, wherein said spacing element has a substantially flat downward-facing surface.

9. The combination of claim 6, wherein said spacing element has a substantially flat downward-facing surface for contacting said lower pipeline.

10. The combination of claim 7, wherein said spacing element has a substantially flat downward-facing surface for contacting the seabed.

11. In combination, an undersea pipeline and a pipeline crossing module mounted on the pipeline, the pipeline crossing module comprising:

a first spacing element and a second spacing element;

a clip element attached between and interconnecting said first and second spacing elements and sized for loosely surrounding the pipeline so as to dispose said first and second spacing elements on opposite sides of said pipeline and to permit the module to rotate about the pipeline to a position in which the second spacing element is disposed downward from the pipeline.

12. The combination of claim 11, wherein said second spacing element is heavier than said first spacing element, such that the module rotates about the pipeline to said position due to the relative weights of the first and second spacing elements.

13. A method of supporting an upper undersea pipeline above a lower undersea pipeline, comprising the steps of:

mounting at least one pipeline crossing module on said upper pipeline, said pipeline crossing module comprising:

a spacing element;

a clip element attached to said spacing element and sized for loosely surrounding the upper pipeline while permitting the module to rotate about the upper pipeline due to its own weight to a position in which the spacing element hangs downward from the upper pipeline;

predicting a predicted position along the length of said upper pipeline where the upper pipeline will cross the lower pipeline;

disposing said module at said predicted position; and disposing said module with its spacing element located on the seabed sufficiently near the lower pipeline for supporting the upper pipeline above the lower pipeline.

\* \* \* \* \*